(12) United States Patent
Zhang et al.

(10) Patent No.: US 12,516,592 B2
(45) Date of Patent: Jan. 6, 2026

(54) OPTIMIZING OPERATION OF A MIXED FLEET OF HYDRAULIC FRACTURING RIGS

(71) Applicant: Caterpillar Inc., Peoria, IL (US)

(72) Inventors: Yanchai Zhang, Dunlap, IL (US); Erik L. Olsen, Peoria, IL (US); Casey A. Otten, Spring, TX (US); Andy Publes, Katy, TX (US)

(73) Assignee: Caterpillar Inc., Peoria, IL (US)

( * ) Notice: Subject to any disclaimer, the term of this patent is extended or adjusted under 35 U.S.C. 154(b) by 599 days.

(21) Appl. No.: 17/577,852

(22) Filed: Jan. 18, 2022

(65) Prior Publication Data

US 2023/0228177 A1 Jul. 20, 2023

(51) Int. Cl.
*E21B 43/26* (2006.01)
*G05B 13/02* (2006.01)
*F04B 17/05* (2006.01)

(52) U.S. Cl.
CPC ........ *E21B 43/2607* (2020.05); *G05B 13/021* (2013.01); *E21B 2200/20* (2020.05); *F04B 17/05* (2013.01)

(58) Field of Classification Search
CPC ............. E21B 43/2607; E21B 2200/20; G05B 13/021; F04B 17/05; F04B 17/03; F04B 23/04; F04B 47/02
USPC ........................................................ 700/282
See application file for complete search history.

(56) References Cited

U.S. PATENT DOCUMENTS

| | | | |
|---|---|---|---|
| 8,205,594 B2 | 6/2012 | Fore et al. | |
| 9,255,531 B2 | 2/2016 | Zhang et al. | |
| 9,683,503 B2 | 6/2017 | Zhang et al. | |
| 9,889,915 B2 | 2/2018 | Zhang et al. | |
| 9,896,982 B1 | 2/2018 | Zhang et al. | |
| 10,131,599 B2 | 11/2018 | Olah et al. | |
| 10,415,348 B2 | 9/2019 | Zhang et al. | |
| 10,458,352 B2 | 10/2019 | Zhang et al. | |
| 10,563,649 B2 | 2/2020 | Zhang et al. | |
| 10,597,996 B2 | 3/2020 | Boone | |
| 10,734,814 B2 | 8/2020 | Converse et al. | |
| 10,760,996 B2 | 9/2020 | Converse et al. | |
| 10,890,061 B2 | 1/2021 | Cai et al. | |
| 10,914,155 B2 | 2/2021 | Oehring et al. | |
| 10,927,774 B2 | 2/2021 | Cai et al. | |
| 11,408,417 B1 * | 8/2022 | Stephenson | F04B 23/06 |

(Continued)

FOREIGN PATENT DOCUMENTS

| | | | |
|---|---|---|---|
| CN | 110608030 A | | 12/2019 |
| CN | 213869837 U | * | 8/2021 |
| WO | 2020219088 A1 | | 10/2020 |

OTHER PUBLICATIONS

Unpublished U.S. Appl. No. 17/110,415, filed Dec. 3, 2020.

*Primary Examiner* — Thomas C Lee
*Assistant Examiner* — Michael Tang (57) ABSTRACT

A method may include receiving a set of inputs for operation of at least one electric hydraulic fracturing rig and at least one mechanical hydraulic fracturing rig of a hydraulic fracturing system. The method may further include optimizing operation of the at least one electric hydraulic fracturing rig and the at least one mechanical hydraulic fracturing rig based on at least the set of inputs. The method may further include iterating the optimization using a cost function for an operation mode of the hydraulic fracturing system.

20 Claims, 9 Drawing Sheets

(56) References Cited

U.S. PATENT DOCUMENTS

| | | | |
|---|---|---|---|
| 2016/0139588 A1* | 5/2016 | Huang | G05B 19/19 |
| | | | 700/275 |
| 2017/0012439 A1 | 1/2017 | Zhang et al. | |
| 2017/0051598 A1 | 2/2017 | Ouenes | |
| 2017/0074076 A1* | 3/2017 | Joseph | G06Q 10/06312 |
| 2017/0130712 A1 | 5/2017 | Zhang et al. | |
| 2017/0328179 A1* | 11/2017 | Dykstra | E21B 43/26 |
| 2020/0300073 A1 | 9/2020 | Hinderliter et al. | |
| 2022/0003229 A1* | 1/2022 | Mu | F04B 17/06 |
| 2022/0154555 A1* | 5/2022 | El Tawy | E21B 43/2607 |

* cited by examiner

OPTIMIZING OPERATION OF A MIXED FLEET OF HYDRAULIC FRACTURING RIGS

TECHNICAL FIELD

The present disclosure relates generally to a hydraulic fracturing system that includes a mixed fleet of multiple hydraulic fracturing rigs, and more particularly, to optimizing operation of the mixed fleet of hydraulic fracturing rigs.

BACKGROUND

Hydraulic fracturing is a means for extracting oil and gas from rock, typically to supplement a horizontal drilling operation. In particular, high pressure fluid is used to fracture the rock, stimulating the flow of oil and gas through the rock to increase the volumes of oil or gas that can be recovered. A hydraulic fracturing rig used to inject high pressure fluid, or fracturing fluid, includes, among other components, an engine, transmission, driveshaft, and pump.

Hydraulic fracturing may involve the use of a hydraulic fracturing system that includes multiple hydraulic fracturing rigs operating at the same or different pressures to achieve a flow rate for the fluid (e.g., measured in barrels per minute). The hydraulic fracturing rigs may include a mix of mechanical and electrical hydraulic fracturing rigs, and the hydraulic fracturing rigs may operate according to several different operational parameters. This can create a complex hydraulic fracturing system of various elements that may be difficult to control for certain objectives. This may result in wasted fuel or power resources, inefficient operation of hydraulic fracturing rigs, and/or the like.

International patent publication WO2020219088A1, published Oct. 29, 2020 ("the '088 publication"), describes that an energy management system may be configured to execute a power control strategy for blending power from an energy storage system and power generated by an electromotive machine during a generating mode to meet variable power demands of a hydraulic fracturing system. However, the '088 publication does not optimize operation of a mixed fleet of hydraulic fracturing rigs (e.g., a fleet that includes both electric hydraulic fracturing rigs and mechanical fracturing rigs) for satisfaction of an objective.

The present disclosure may solve one or more of the problems set forth above and/or other problems in the art. The scope of the current disclosure, however, is defined by the attached claims, and not by the ability to solve any specific problem.

SUMMARY

In one aspect, a hydraulic fracturing system may include at least one electric hydraulic fracturing rig, at least one mechanical hydraulic fracturing rig, and a non-transitory computer-readable medium storing instructions. The instructions, when executed by a processor of the hydraulic fracturing system, may cause the processor to receive a set of inputs for operation of the at least one electric hydraulic fracturing rig and the at least one mechanical hydraulic fracturing rig. The processor may be further caused to optimize operation of the at least one electric hydraulic fracturing rig and the at least one mechanical hydraulic fracturing rig based on at least the set of inputs. The processor may be further caused to iterate the optimization using a cost function for an operation mode of the hydraulic fracturing system.

In another aspect, a method may include receiving a set of inputs for operation of at least one electric hydraulic fracturing rig and at least one mechanical hydraulic fracturing rig of a hydraulic fracturing system. The method may further include optimizing operation of the at least one electric hydraulic fracturing rig and the at least one mechanical hydraulic fracturing rig based on at least the set of inputs. The method may further include iterating the optimization using a cost function for an operation mode of the hydraulic fracturing system.

In yet another aspect, a controller for a hydraulic fracturing system may be configured to receive a set of inputs for operation of at least one electric hydraulic fracturing rig and at least one mechanical hydraulic fracturing rig of a hydraulic fracturing system. The controller may be further configured to optimize operation of the at least one electric hydraulic fracturing rig and the at least one mechanical hydraulic fracturing rig based on at least the set of inputs and iterate the optimization using a cost function for an operation mode of the hydraulic fracturing system.

Other features and aspects of this disclosure will be apparent from the following description and the accompanying drawings.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
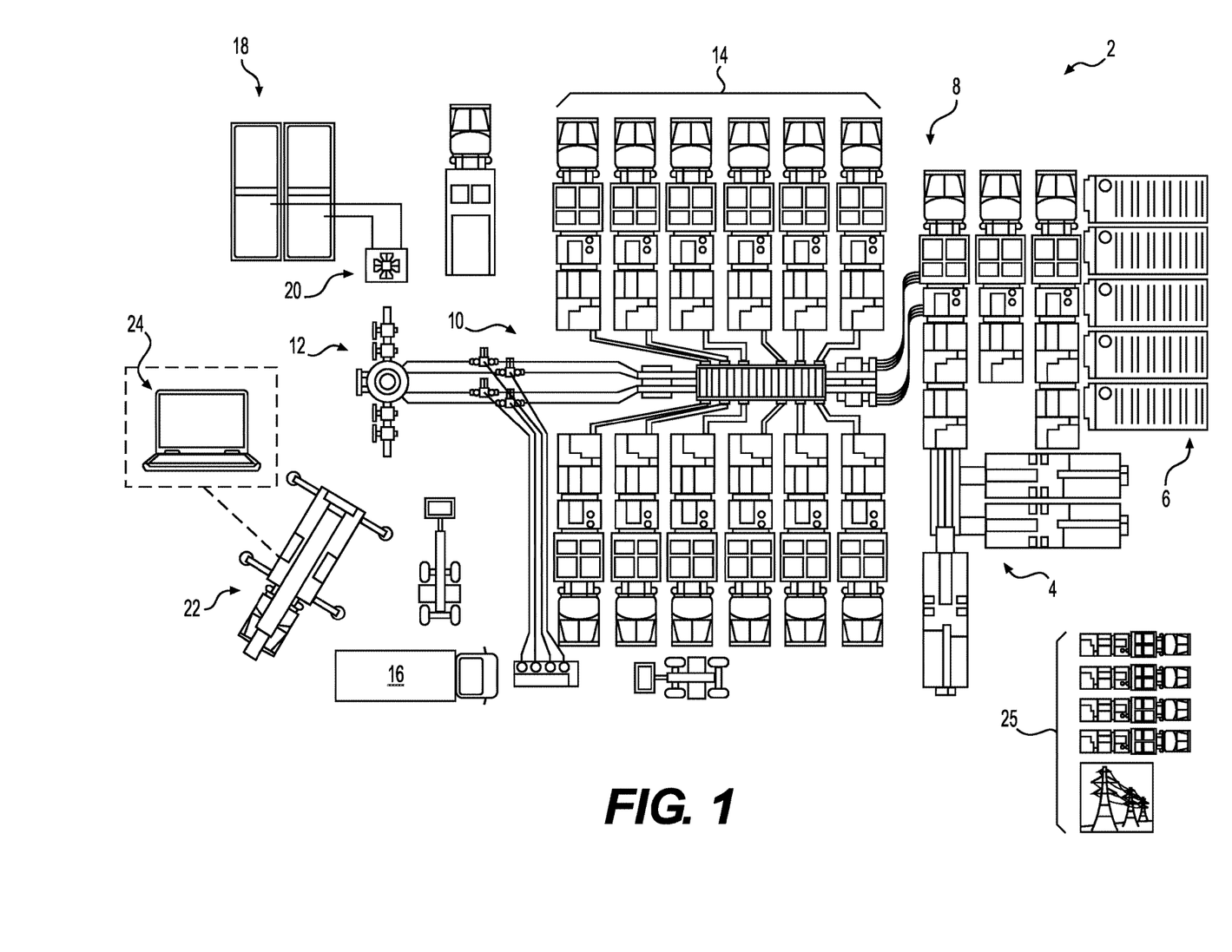
FIG. 1 is a schematic diagram of an exemplary hydraulic fracturing system including a mixed fleet of hydraulic fracturing rigs, according to aspects of the disclosure.

FIG. 1 illustrates an exemplary hydraulic fracturing system 2, according to aspects of the disclosure. In particular, FIG. 1 depicts an exemplary site layout according to a well stimulation stage (i.e., hydraulic fracturing stage) of a drilling/mining process, such as after a well has been drilled at the site and the equipment used for drilling removed. The hydraulic fracturing system 2 may include fluid storage tanks 4, sand storage tanks 6, and blending equipment 8 for preparing a fracturing fluid. The fracturing fluid, which may, for example, include water, sand, and one or more chemicals, may be injected at high pressure through one or more fluid lines 10 to a well head 12 using a plurality of hydraulic fracturing rigs 14. A hydraulic fracturing rig 14 may include a mechanical hydraulic fracturing rig 14 that includes, e.g., a gas or diesel engine, a pump, and a transmission. Alternatively, a hydraulic fracturing rig 14 may include an electric hydraulic fracturing rig 14 that includes, e.g., an electric motor, a variable frequency drive (VFD), and a pump.

A trailer-mounted bleed off tank 16 may be provided to receive bleed off liquid or gas from the fluid lines 10. In addition, nitrogen, which may be beneficial to the hydraulic fracturing process for a variety of reasons, may be stored in tanks 18, with a pumping system 20 used to supply the nitrogen from the tanks 18 to the fluid lines 10 or the well head 12.

The hydraulic fracturing process performed at the site, using the hydraulic fracturing system 2 of the present disclosure, and the equipment used in the process, may be managed and/or monitored from a single location, such as a data monitoring system 22, located at the site or at additional or alternative locations. According to an example, the data monitoring system 22 may be supported on a van, truck or may be otherwise mobile. As will be described below, the data monitoring system 22 may include a user device 24 for displaying or inputting data for monitoring performance and/or controlling operation of the hydraulic fracturing system 2. According to one embodiment, the data gathered by the data monitoring system 22 may be sent off-board or off-site for monitoring performance and/or performing calculations relative to the hydraulic fracturing system 2.

As further illustrated in FIG. 1, the hydraulic fracturing system 2 may include one or more power sources 25. For example, the one or more power sources may include one or more trailer-mounted generators (e.g., gas or diesel generators), a utility power grid, energy storages (e.g., batteries or hydrogen fuel cells), and/or the like. Additionally, or alternatively, the one or more power sources may include gas turbines, renewable power sources, such as solar panels or wind turbines, and/or the like.

Figure 2:
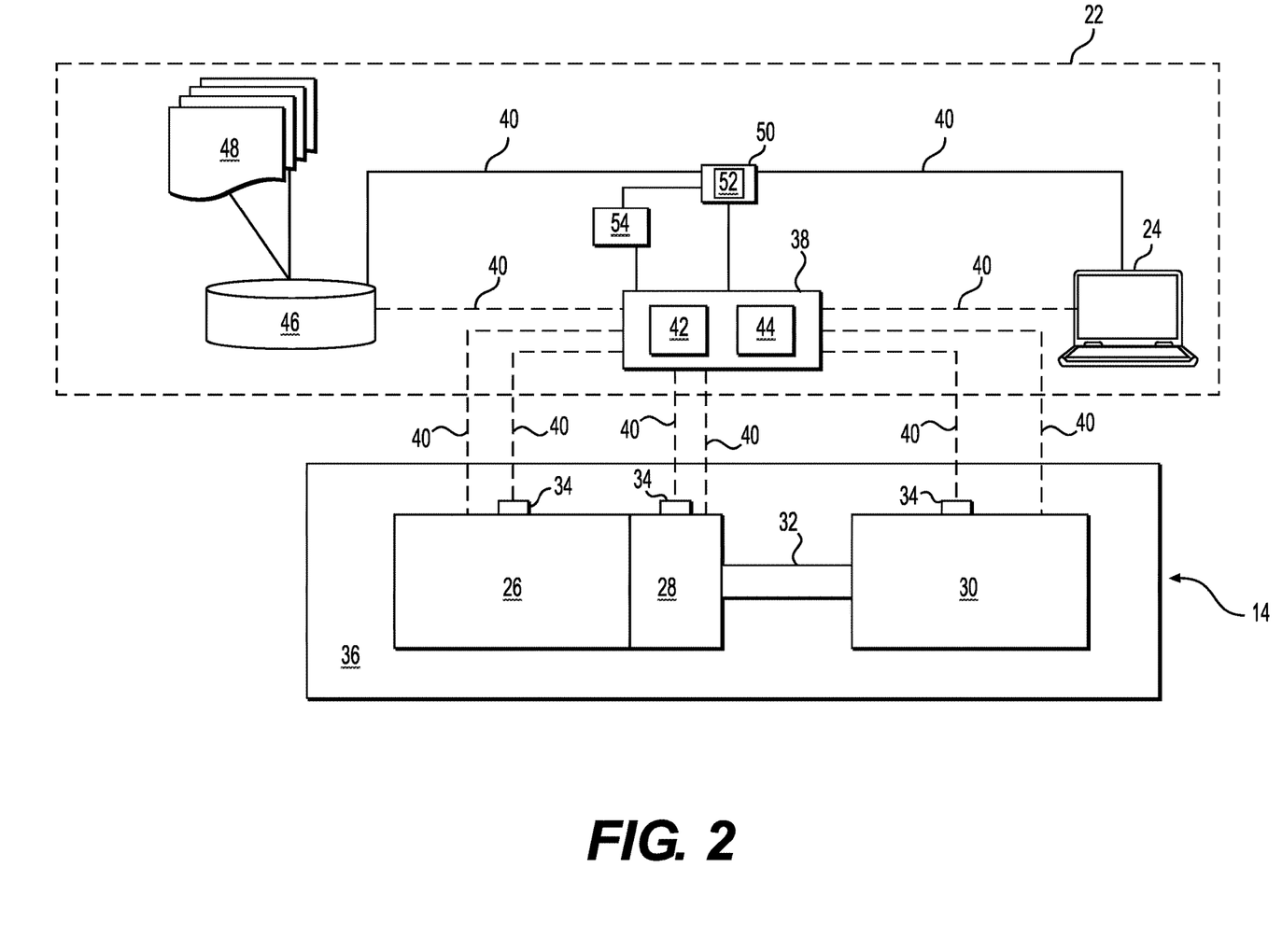
FIG. 2 is a schematic diagram of a hydraulic fracturing rig and associated systems of the hydraulic fracturing system of FIG. 1, according to aspects of the disclosure.

Referring to FIG. 2, the plurality of hydraulic fracturing rigs 14 may each generally include an engine 26 or other source of power (e.g., a turbine or an electric motor with a variable frequency drive (VFD) in the case of an electric hydraulic fracturing rig 14), a transmission 28, and a hydraulic fracturing pump 30. A driveshaft 32 may be coupled between the transmission 28 and the hydraulic fracturing pump 30 for transferring torque from the engine 26 to the hydraulic fracturing pump 30. One or more components of the hydraulic fracturing rig 14 may be, or may include, a fuel consumption component that is configured to consume fuel (e.g., diesel, natural gas, hydrogen, or synthesis gas) during operation of the hydraulic fracturing rig 14, and the engine 26 may be one example of a fuel consumption component. Additionally, or alternatively, one or more components of the hydraulic fracturing rig 14 may be, or may include, an emissions component that outputs emissions during operation of the hydraulic fracturing rig 14, and an exhaust of the engine 26 may be one example of an emissions component.

A hydraulic fracturing rig 14 may further include one or more systems configured to control or reduce emissions from the fuel consumption component or the emissions component. For example, the hydraulic fracturing rig 14 may include a selective catalytic reduction (SCR) system configured to implement a process where a reagent known as diesel exhaust fluid (DEF), such as urea or a water/urea solution, is selectively injected into the exhaust gas stream of the engine 26 and absorbed onto a downstream substrate in order to reduce the amount of nitrogen oxides in the exhaust gases. As another example, the hydraulic fracturing rig 14 may include an exhaust gas recirculation (EGR) system configured to recirculate a portion of the exhaust gasses from the engine 26 back into an air induction system for subsequent combustion. As yet another example, the hydraulic fracturing rig 14 may include a lean burn system configured to burn, or attempt to burn, gaseous fuel and air at a stoichiometrically lean equivalence ratio.

One or more sensors 34 may be positioned and configured to detect or measure one or more physical properties related to operation and/or performance of the various components of the hydraulic fracturing rig 14. For example, a sensor 34 may provide a sensor signal indicative of the fracturing fluid inlet or outlet pressure at pump 30, a sensor signal indicative of a rotational speed of an engine 26, a sensor signal indicative of a gear position of the transmission 28, a sensor signal indicative of an amount of fuel consumed by the engine 26, a sensor signal indicative of an amount of certain gasses or particulates in emissions from the engine 26, a temperature of the engine 26, and/or the like. The hydraulic fracturing rig 14 may be mobile, such as supported on a tractor-trailer 36, so that it may be more easily transported from site to site. Each of the hydraulic fracturing rigs 14 included in the hydraulic fracturing system 2 may or may not have similar configurations.

At least one controller 38 may be provided, and may be part of, or may communicate with, the data monitoring system 22. The controller 38 may reside in whole or in part at the data monitoring system 22, or elsewhere relative to the hydraulic fracturing system 2. Further, the controller 38 may be configured to communicate with the sensors 34 and/or various other systems or devices via wired and/or wireless communication lines 40, using available communication schemes, to monitor and control various aspects of each hydraulic fracturing rig 14 and/or each respective engine 26, transmission 28, and/or hydraulic fracturing pump 30. There may be one or more controllers 38 positioned at or supported on each component of the hydraulic fracturing rig 14, and one or more controllers 38 configured for coordinating control of the component-level controllers 38 and/or the overall hydraulic fracturing system 2.

The controller 38 may include a processor 42 and a memory 44. The processor 42 may include a central processing unit (CPU), a graphics processing unit (GPU), a microprocessor, a digital signal processor and/or other processing units or components. Additionally, or alternatively, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor 42 may possess its own local memory 44, which also may store program modules, program data, and/or one or more operating systems. The processor 42 may include one or more cores.

The memory 44 may be a non-transitory computer-readable medium that may include volatile and/or nonvolatile memory, removable and/or non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device (e.g., the user device 24, a server device, etc.). The memory 44 may be implemented as computer-readable storage media (CRSM), which may be any available physical media accessible by the processor 42 to execute instructions stored on the memory 44. The memory 44 may have an operating system (OS) and/or a variety of suitable applications stored thereon. The OS, when executed by the processor 42, may enable management of hardware and/or software resources of the controller 38.

The memory 44 may be capable of storing various computer readable instructions for performing certain operations described herein (e.g., operations of a site controller 50 and/or the controller 38). The instructions, when executed by the processor 42, may cause certain operations described herein to be performed.

In addition to the controller 38, the data monitoring system 22 may include, or may be in communication with, the site controller 50. Similar to the controller 38, the site controller 50 may reside in whole or in part at the data monitoring system 22, or elsewhere relative to the hydraulic fracturing system 2. Although the controller 38 and the site controller 50 may include similar components, the controller 38 may be associated with controlling a particular piece of equipment (or component thereof), such as a hydraulic fracturing rig 14, whereas the site controller 50 may control and/or coordinate operations of multiple pieces of equipment, such as multiple hydraulic fracturing rigs 14 or a combination of a hydraulic fracturing rig 14 and the blending equipment 8 at a site or across multiple sites.

Although not illustrated in FIG. 2, the site controller 50 may also include a processor 42 and a memory 44. The site controller 50 may be configured to communicate with the controller 38 and/or various other systems or devices via wired and/or wireless communication lines 40 to monitor and/or control various aspects of the hydraulic fracturing rig 14 or components thereof, as described elsewhere herein. For instance, the site controller 50 may store and/or execute an optimization program 52 to optimize fuel costs and/or emissions costs of the hydraulic fracturing rig 14 and/or the hydraulic fracturing system 2 (e.g., based on data stored in the memory 44 of the site controller 50 or as otherwise provided to the site controller 50, such as via the user device 24 or from database 46 as data 48). Data used by the site controller 50 may include power supply operation-related information, cost-related information, power demand-related information, or operational priority and/or site configuration-related information, as described elsewhere herein. However, various other additional or alternative data may be used.

The data monitoring system 22 may further include a load manager 54. The load manager 54 may include a processor 42 and a memory 44 (not illustrated in FIG. 2) and may be configured to determine a power demand for the engine 26 based on, for example, operator input related to fracturing operations at a site.

Figure 3:
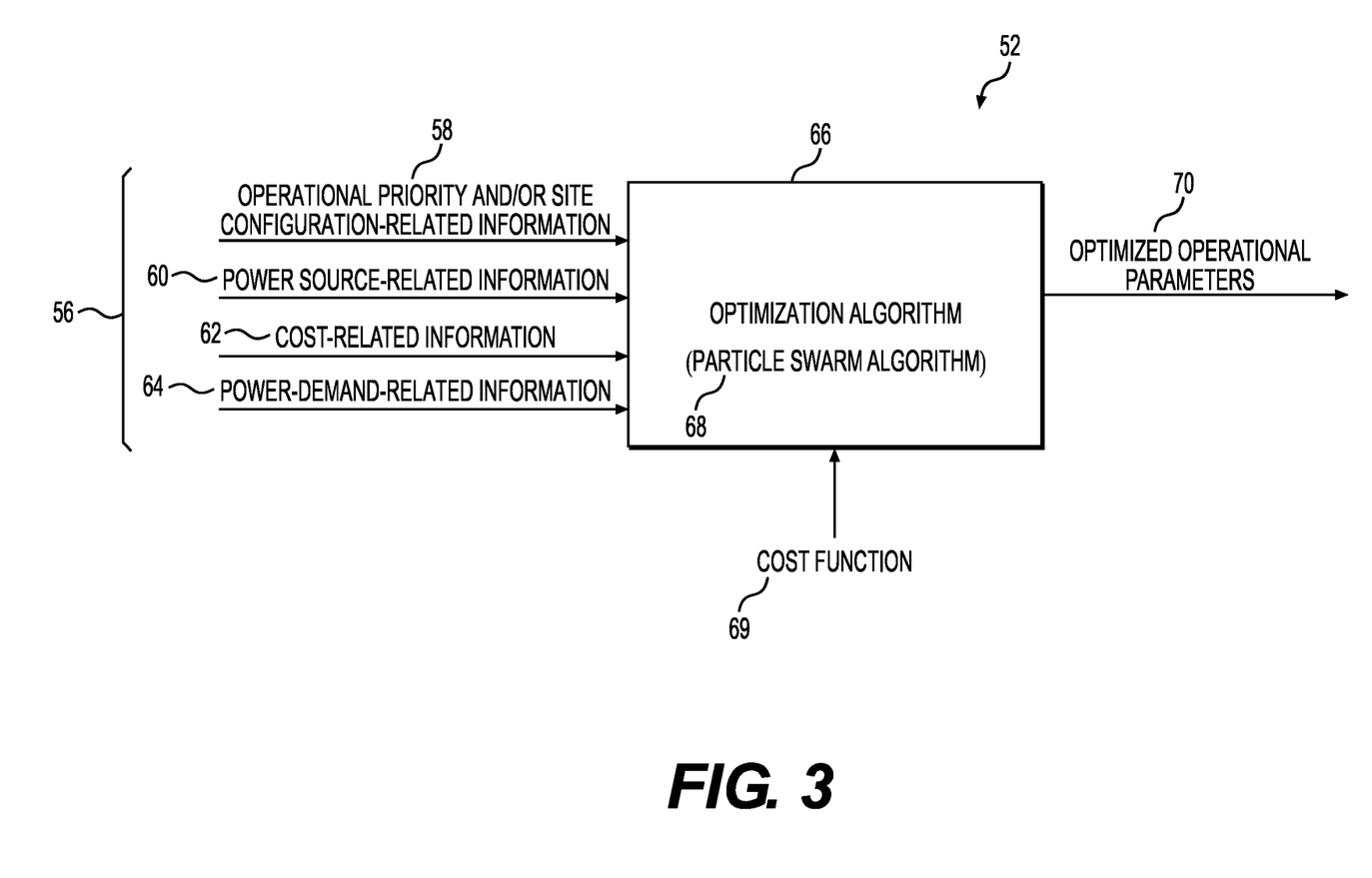
FIG. 3 is a diagram illustrating an exemplary optimization algorithm, according to aspects of the disclosure.

FIG. 3 is a diagram illustrating an exemplary optimization program 52, according to aspects of the disclosure. As illustrated in FIG. 3, the optimization program 52 may receive input data 56 and may provide the input data 56 to an optimization algorithm 66. For example, the optimization program 52 may receive the input data 56 from the user device 24 (e.g., a user may input the input data 56 via the user device 24), from a server device, from a database, from memory of various equipment or components thereof of the hydraulic fracturing system 2, and/or the like. The optimization program 52 may receive the input data 56 as a stream of data during operation of the hydraulic fracturing system 2, prior to starting operations of the hydraulic fracturing system 2, and/or the like. The input data 56 may be predetermined and provided to the optimization program 52 (e.g., may be based on experimental or factory measurements of equipment), may be generated by the controller 50 (e.g., the controller 50 may broadcast a ping communication at a site in order to receive response pings from equipment at the site to determine which equipment is present, the site controller 50 may measure, from sensor signals, the input data 56, etc.), and/or the like.

The input data 56 may include operational priority and/or site configuration-related information 58. For example, the operational priority and/or site configuration-related information 58 may include a priority among multiple hydraulic fracturing rigs 14, an operating mode priority for operation of the hydraulic fracturing rig 14 (e.g., a prioritization of fuel cost reduction over emissions reduction, or vice versa), a quantity of hydraulic fracturing rigs 14 at a site, a maximum allowed pressure or flow rate of a hydraulic fracturing rig 14 at the site, quantities and/or types of other equipment located at the site, ages, makes, models, and/or configurations of the equipment at the site, and/or the like. Additionally, or alternatively, the input data 56 may include power source-related information 60. For example, the power source-related information 60 may include numbers and/or types of power sources available at a site, configured power output ranges for the power sources, a cost of the power output from different types of power sources and/or individual instances of types of power sources, and/or the like.

Additionally, or alternatively, the input data 56 may include cost-related information 62. For example, the cost-related information 62 may include a cost of fuel or power for the hydraulic fracturing rig 14, a total cost of ownership of the hydraulic fracturing rig 14 (e.g., including maintenance costs, costs of fracturing fluid, or personnel costs), a cost of emissions (e.g., regulatory costs applied to emissions or costs related to reducing emissions, such as diesel exhaust fluid (DEF) costs), and/or the like. Additionally, or alternatively, the input data 56 may include power demand-related information 64. For example, the power demand-related information 64 may include a power demand for an experienced or expected load on an engine of a hydraulic fracturing rig 14 (e.g., flow, proppant demand, or pressure response), a desired flow rate of fracturing fluid at a well head, a desired output pressure or discharge pressure of the fracturing fluid, a desired gear ratio of a transmission of a hydraulic fracturing rig 14, a desired transmission speed of the transmission, and/or the like. The input data 56 may include various other types of data depending on the objective to be optimized by the optimization algorithm 66. For example, the input data 56 may include transmission gear life predictions, pump cavitation predictions, pump life predictions, engine life predictions, and/or the like.

As described in more detail below (e.g., with respect to FIGS. 4-9), the optimization algorithm 66 may process the input data 56 after receiving the input data 56. For example, the optimization algorithm 66 may be a particle swarm algorithm 68 that processes the input data 56. The optimization algorithm 66 may additionally, or alternatively, use a cost function 69 as input to the optimization algorithm 66. A particle swarm algorithm 68 may be run on the input data 56 to iteratively tune operational parameters to search for a set of optimized operational parameters 70 ($P_1, P_2, \ldots P_n$) that achieve an optimization objective. A particle swarm algorithm is described in connection with certain embodiments merely as an example, and certain embodiments may use any optimization algorithm in the art. A cost function 69 may include a mathematical function that maps values for one or more variables to a total score or cost. The optimization algorithm 66 may use the cost function 69 to generate the optimized operational parameters 70, as described herein.

The optimization algorithm 66 may then output optimized operational parameters 70 for the hydraulic fracturing system 2 to the user device 24 for viewing or modification, to the controller 38 and/or the controller 50 to control operations of the hydraulic fracturing system 2, and/or to a database for storage. Optimized operational parameters 70 may include, for example, a flow rate, a motor speed, an engine speed, a transmission gear, and/or the like.

The optimization algorithm 66 may be configured to search for a set of optimized operational parameters 70 that achieve an objective. For example, in determining values for optimized operational parameters 70, the controller 50 may minimize or reduce an objective, maximize or increase an objective, and/or balance two or more objectives (e.g., maximize a first objective while keeping a second objective under a threshold value). In this way, "optimized," "optimization" and similar terms used herein may refer to selection of values (for operational parameters), based on some criteria (an objective), from a set of available values. An objective may be of any suitable type, such as minimizing the cost of fracturing operations of the hydraulic fracturing system 2, minimizing fuel or power consumption of the hydraulic fracturing system 2, minimizing emissions from the hydraulic fracturing system 2, maximizing an operational life of equipment of the hydraulic fracturing system 2, minimizing an overall time of the hydraulic fracturing operations, minimizing a cost of ownership of equipment used in the hydraulic fracturing operations, maximizing a maintenance interval of equipment of the hydraulic fracturing system 2, and/or any combinations thereof. As a specific example, the controller 50 may, given minimum operational expectations, maximize fuel or power savings, minimize emissions, minimize total cost of operation or ownership of a fleet of hydraulic fracturing rigs 14 considering the costs of various operational parameters, balance maintenance intervals and maintenance costs, and/or the like.

INDUSTRIAL APPLICABILITY

The aspects of the site controller 50 of the present disclosure and, in particular, the methods executed by the site controller 50 may be used to optimize operation of a mixed fleet of hydraulic fracturing rigs. For example, the methods executed by the site controller 50 may individually control different types of hydraulic fracturing rigs 14 for certain objectives. Thus, certain aspects described herein may provide various advantages to the operation of the hydraulic fracturing rigs 14, such as individual optimization of hydraulic fracturing rigs 14 while achieving certain objectives, such as minimizing fuel or power consumption, optimizing maintenance intervals, etc. For example, the controller 50 may evaluate a desired mode of operation for the hydraulic fracturing system 2 (e.g., based on input to the site controller 50) and may make real-time (or near real-time) decisions to operate hydraulic fracturing rigs 14 on a cost-effective point based on, e.g., utility cost, fuel cost, health of equipment, and/or the like.

Figure 4:
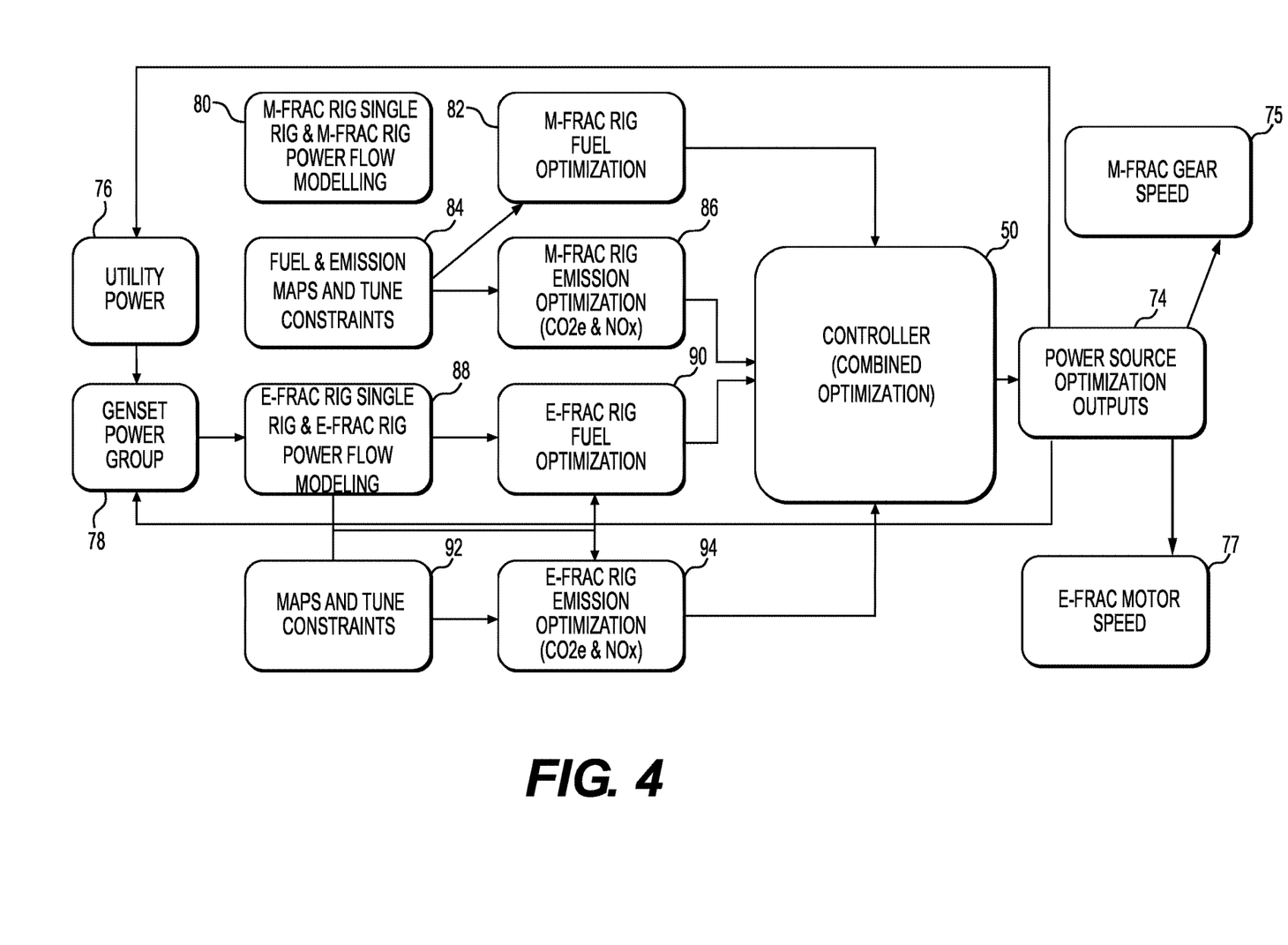
FIG. 4 is a diagram illustrating an exemplary optimization architecture for a mixed fleet, according to aspects of the disclosure.

FIG. 4 is a diagram illustrating an exemplary optimization architecture for a mixed fleet, according to aspects of the disclosure. As illustrated, the controller 50 may receive various inputs (e.g., input data 56) for combined optimization and may output power source optimization outputs 74 (e.g., may output optimized operational parameters 70 for the power sources 25). The outputs 74 from the site controller 50 may be provided to a utility power source 76 and/or genset power group 78. The outputs 74 may include, for example, a mechanical fracturing rig ("M-FRAC") gear speed 75 and/or an electric fracturing rig ("E-FRAC") motor speed 77.

The input to the controller 50 may include modeling 80 for a single mechanical hydraulic fracturing rig ("M-FRAC RIG") 14 and for mechanical hydraulic fracturing rig 14 power flow and may further include mechanical hydraulic fracturing rig 14 fuel optimization 82. Additionally, or alternatively, the input to the controller 50 may include fuel and emission maps and tune constraints 84 and optimization 86 for mechanical hydraulic fracturing rig 14 emissions (e.g., for carbon dioxide equivalents (CO2e) and nitrogen oxides (NOx)). Additionally, or alternatively, the controller 50 may receive modeling 88 for a single electric hydraulic fracturing rig ("E-FRAC RIG") 14 and for electric hydraulic fracturing rig 14 power flow. The input to the controller 50 may further include fuel optimization 90 for an electric hydraulic fracturing rig 14. Additionally, or alternatively, the input to the controller 50 may include maps (e.g., efficiency maps, such as brake specific fuel consumption (BSFC) maps) and tune constraints 92 and optimization 94 for electric hydraulic fracturing rig 14 emissions.

Figure 5:
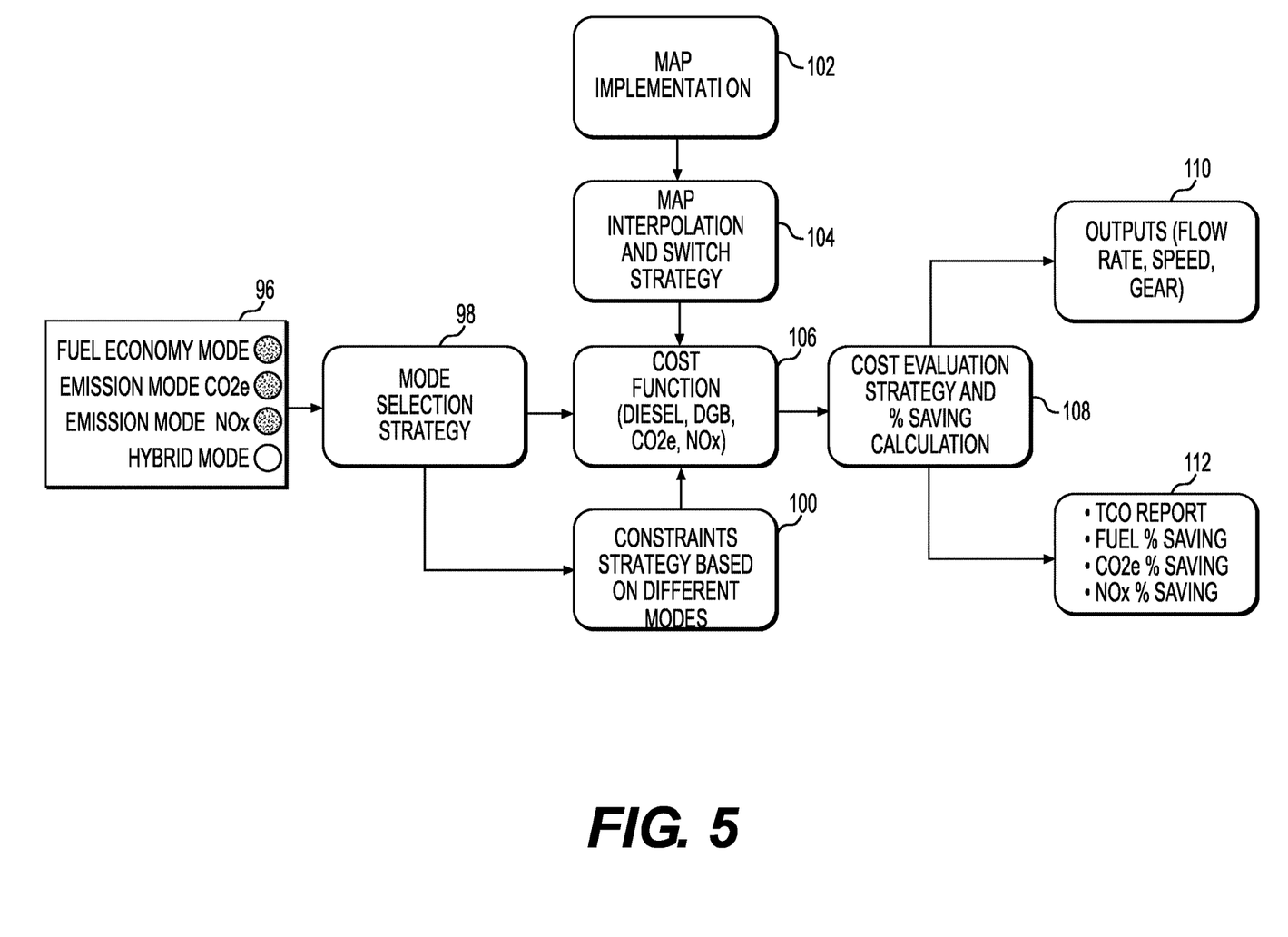
FIG. 5 is a diagram illustrating exemplary optimization-related operations, according to aspects of the disclosure.

FIG. 5 is a diagram illustrating exemplary optimization-related operations (e.g., performed by the controller 50), according to aspects of the disclosure. As illustrated, the operations may include receiving a mode selection at 96. For example, a mode may be related to an operation objective for the hydraulic fracturing rigs 14. As specific examples, the mode may include a fuel economy mode that has the objective to reduce or optimize fuel (or power) costs or consumption, an emissions mode that has the objective to reduce or optimize emissions (e.g., a total amount of emissions, for specific types of emissions, etc.), or a hybrid mode that combines multiple objectives for multiple modes.

The operations may further include determining an optimization strategy for the mode selection at 98. For example, the controller 50 may determine an objective for the selected mode. The operations may include, at 100, determining a constraints strategy based on the selected mode and/or mode selection strategy (e.g., different constraints for the cost function 69) and inputting these constraints to the cost function at 106 (e.g., a diesel cost function, a dynamic gas blending (DGB) cost function, a CO2e cost function, or a NOx cost function). For an additional input to the cost function 106, a map implementation at 102 may be input to a map interpolation and switch strategy 104. For example, the map interpolation and switch strategy at 104 may include rules for using or interpreting an emissions map, and the strategy may vary based on the type of map.

As illustrated at 108, based on output from the cost function, the operations may include selecting a cost evaluation strategy and performing a percentage (%) saving calculation. For example, the controller 50 may select a particular manner for evaluating costs of the hydraulic fracturing operations and may determine an amount of costs saved based on optimizing operations of the fleet of hydraulic fracturing rigs 14. As illustrated at 110, the operations may output operational parameters such as a flow rate, an engine speed, or a gear based on the cost evaluation strategy and/or savings calculation. Additionally, or alternatively, and as illustrated at 112, the operations may output a total cost of ownership (TCO) report, a percentage of fuel savings, a percentage of emissions savings, and/or the like based on optimized operational parameters for the mixed fleet of hydraulic fracturing rigs 14.

Figure 6:
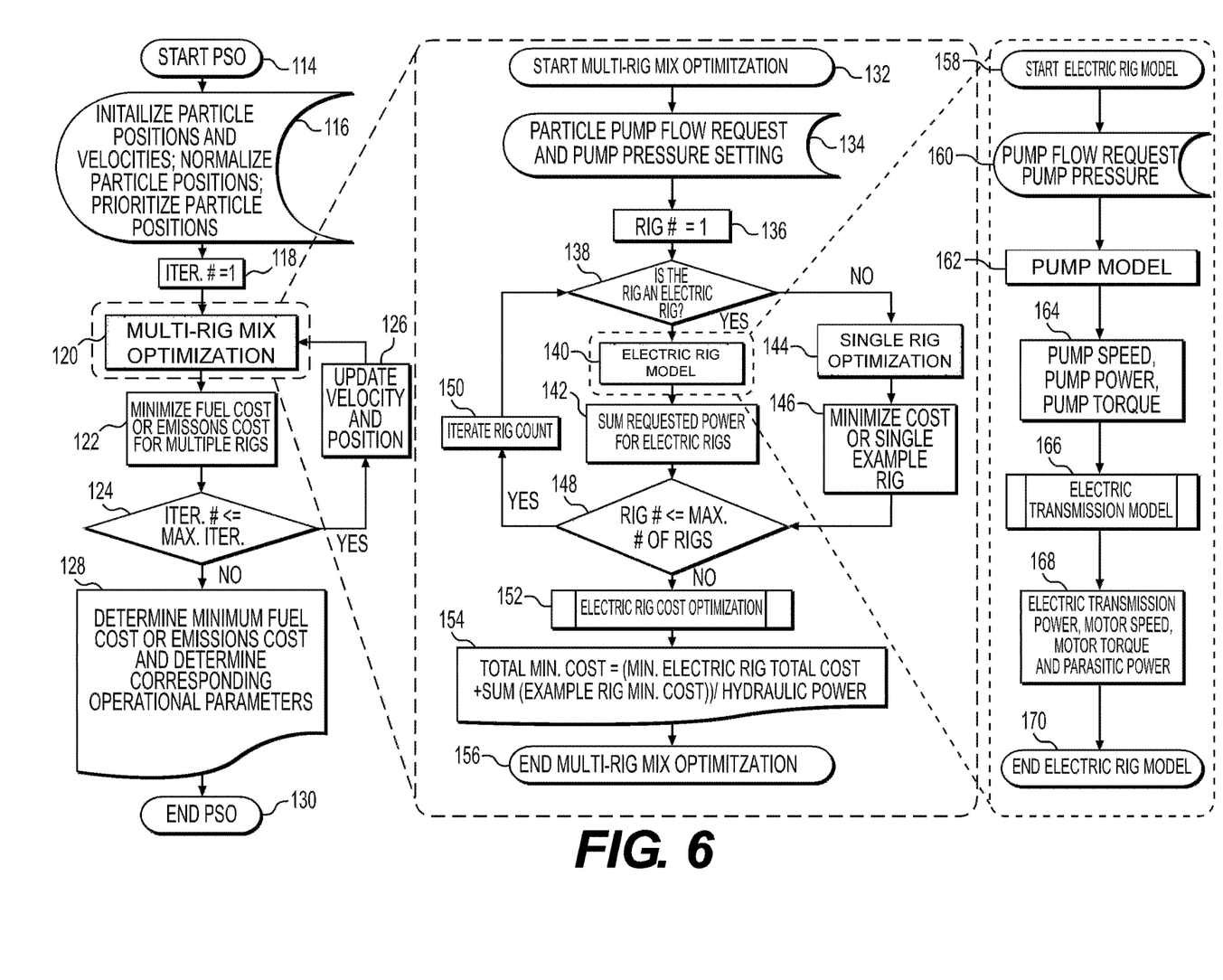
FIG. 6 illustrates a flowchart depicting an exemplary method for optimizing operation of a mixed fleet of hydraulic fracturing rigs, according to aspects of the disclosure.

FIG. 6 illustrates a flowchart depicting an exemplary method for optimizing operation of a mixed fleet of hydraulic fracturing rigs, according to aspects of the disclosure. For example, the controller 50 may perform the method illustrated in FIG. 6.

As illustrated at step 114, the method may include starting a particle swarm optimization (PSO). For example, starting the PSO may include starting using the particle swarm algorithm 68. At step 116, the method may include initializing particle positions and velocities. In addition, the step 116 may include normalizing the particle positions and prioritizing the particle positions. The method may further include, at step 118, setting an iteration value to "1" at the start of the particle swarm algorithm 68. At step 120, the method may include a multi-rig mix optimization. For example, the controller 50 may use the optimization algorithm 66 to determine the optimized operational parameters 70 for a mixed fleet of hydraulic fracturing rigs 14. At step 122, the method may include determining a minimized fuel cost or an emission cost for an operational parameter of a hydraulic fracturing rig 14. Additionally, or alternatively, the method may include determining operational parameters of the hydraulic fracturing rigs 14 based on one or more other objectives described herein.

As further illustrated, the method may include, at step 124, determining whether the iteration value is less than or equal to a maximum iteration value. For example, the maximum iteration value may be based on the number of hydraulic fracturing rigs 14, may be based on the objective to be optimized, may be configured by a user of the user device 24, and/or the like. If the iteration value is less than or equal to the maximum iteration (step 124—YES), then the method may include updating the velocity and position for a particle, as illustrated at step 126. If the iteration value is greater than the maximum iteration value (step 124—NO), then the method may include determining a minimum fuel or emissions cost for the set of hydraulic fracturing rigs 14 and determining corresponding optimized operational parameters 70. For example, the controller may determine optimized operational parameters 70 that minimize fuel cost or emissions cost for a set of hydraulic fracturing rigs 14 based on the optimized operational parameters 70 for individual hydraulic fracturing rigs 14. The optimized operational parameters 70 may include gear number, engine speed, engine load, diesel rate, liquid natural gas (LNG) rate, CO2e rate, NOx rate, and/or the like. As illustrated at step 130, the method may include ending the PSO.

The multi-rig 14 mix optimization at step 120 may include various sub-steps 132 through 156. At step 132, the method may include starting the multi-rig 14 mix optimization. As illustrated at step 134, the method may include receiving a particle pump flow request and pump pressure setting for the fleet of hydraulic fracturing rigs 14. The step 136 may include setting the rig 14 number to "1" for a first hydraulic fracturing rig 14 of a fleet after starting the multi-rig 14 mix optimization. The method may include, at step 138, determining whether the first hydraulic fracturing rig 14 is an electric hydraulic fracturing rig 14. If the first hydraulic fracturing rig 14 is an electric hydraulic fracturing rig 14 (step 138—YES), then the method may include starting an electric hydraulic fracturing rig 14 model, at step 140. As illustrated at step 142, the method may include summing the requested power for the electric hydraulic fracturing rigs 14 based on output from the electric hydraulic fracturing rig 14 model at step 140. The method may include, at step 148, determining whether the hydraulic fracturing rig 14 number is less than or equal to a maximum number of hydraulic fracturing rigs 14. If the hydraulic fracturing rig 14 number is less than or equal to the maximum number (step 150—YES), then the method may include iterating the hydraulic fracturing rig 14 count by one and returning to the step at 138.

Continuing still with the first iteration of the method, if the hydraulic fracturing rig 14 is determined to not be an electric hydraulic fracturing rig 14 at step 138 (step 138—NO), then the method may include, at step 144, performing a single hydraulic fracturing rig 14 optimization. For example, the controller 50 may use the optimization algorithm 66 to perform the optimization. At step 146, the method may include minimizing cost in connection with the optimization or basing the optimization on a single example hydraulic fracturing 14. For example, the controller 50 may base the optimization on parameters that have been predetermined to be optimal for mechanical hydraulic fracturing rigs 14 generally. The method may then include performing the steps 148 and/or 150 depending on the outcome of the determination at step 148.

At step 152, if the hydraulic fracturing rig 14 number is greater than the maximum number of hydraulic fracturing rigs 14 (step 148—NO), then the method may include, at step 152, performing an electric hydraulic fracturing rig 14 cost optimization. The method may further include, at step 154, determining a total minimum cost. For example, the total minimum cost may be determined by adding the total minimum cost for the electric hydraulic fracturing rigs 14 and the sum of the costs for the mechanical hydraulic fracturing rigs 14 and dividing the added value by an amount of hydraulic power. As illustrated at step 156, the method may include ending the multi-rig 14 mix optimization.

The electric rig 14 model at step 140 may include various sub-steps 158 through 170. At step 158, the method may include starting an electric hydraulic fracturing rig 14 model. At step 160, the method may include receiving a pump flow request and pump pressure. The method may further include, at step 162, processing the pump flow request and pump pressure using a pump model and outputting, at step 164, operational parameters, such as pump speed, pump power, and pump torque. As illustrated at 166, the method may include inputting the operational parameters from the pump model to an electric transmission model. As illustrated at 168, the electric transmission model may output operational parameters, such as electric transmission power, motor speed, motor torque, and parasitic power. As illustrated at 170, the method may include ending the electric hydraulic fracturing rig 14 model.

Figure 7:
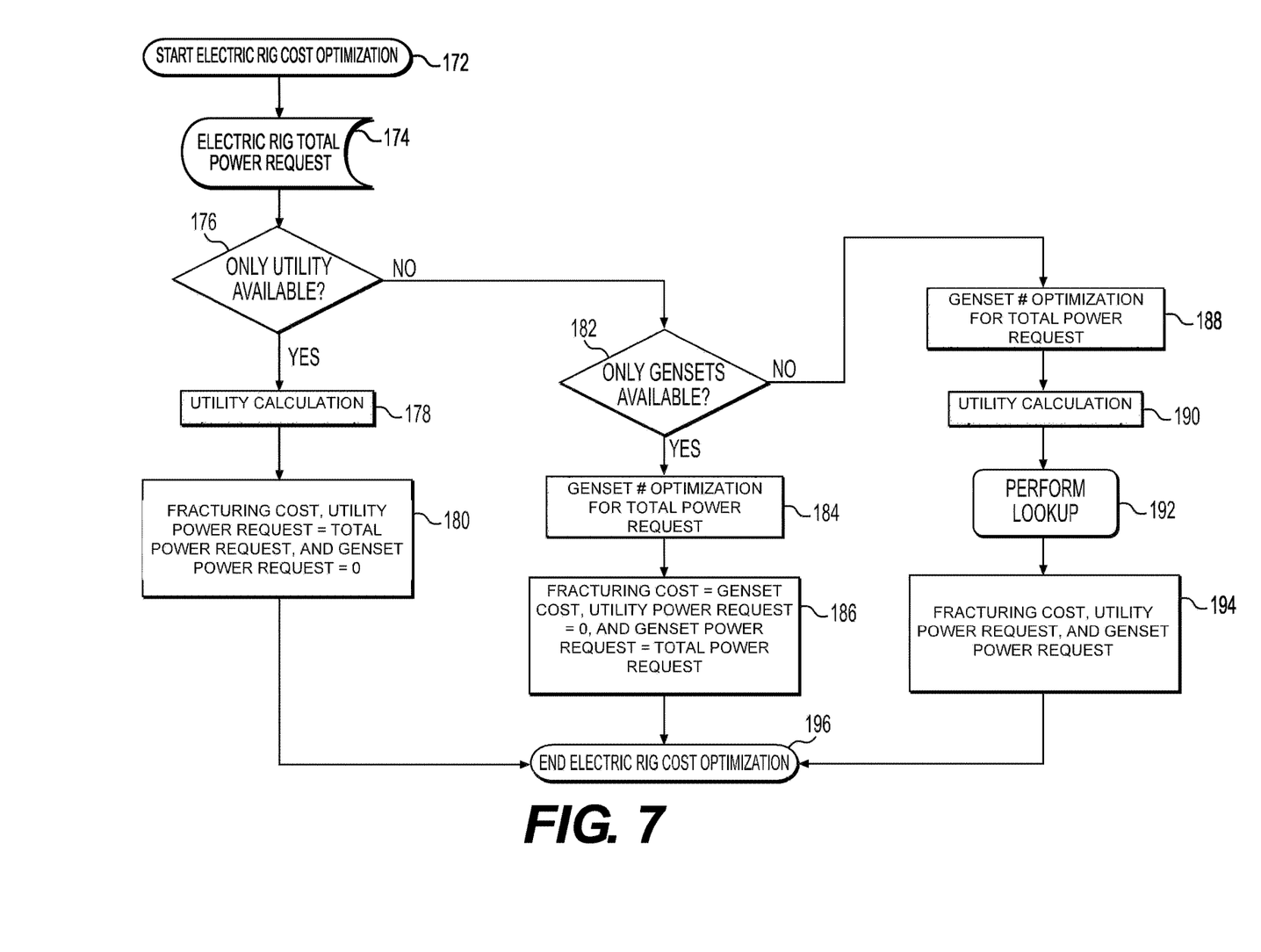
FIG. 7 illustrates a flowchart depicting an exemplary method for electric hydraulic fracturing rig cost optimization, according to aspects of the disclosure.

FIG. 7 illustrates a flowchart depicting an exemplary method for electric hydraulic fracturing rig cost optimization, according to aspects of the disclosure. For example, FIG. 7 illustrates various sub-steps 172 through 196 of the electric rig 14 cost optimization at step 152 of FIG. 6. The method illustrated in FIG. 7 may be performed by the controller 50.

The method may include, at step 172, starting the electric hydraulic fracturing rig 14 cost optimization. At step 174, the method may include receiving an electric rig 14 total power request (e.g., for multiple hydraulic fracturing rigs 14). The method may include determining whether only utility power is available, at step 176. If only utility power is available (step 176—YES), then the method may include, at step 178, performing a utility calculation (e.g., by multiplying the power request by the cost of utility power). The method may then include, at step 180, determining, based on the utility calculation, a diagnostic code (e.g., if a request violates a constraint or limit), a fracturing cost, that the utility power request is equal to the total power request, and that the genset power request is equal to 0. The method may then include ending the electric rig 14 cost optimization at step 196.

Returning to the step 176, if the utility power is not the only power source available (step 176—NO), then the method may include, at step 182, determining whether only gensets are available as power sources. If only gensets are available (step 182—YES), then the method may include determining an optimized number of gensets for the total power request, at step 184. At step 186, the method may include determining, based on the genset optimization, a diagnostic code, that the fracturing cost is equal to the genset cost, that the utility power request is equal to 0, and that the genset power request is equal to the total power request. The method may then include, at step 196, ending the electric rig 14 cost optimization.

Returning to the step 182, if the gensets are not the only power sources (step 182—NO), then the method may include determining an optimal number of gensets for the total power request, at step 188. The method may further include, at step 190, performing the utility calculation. Based on the optimal genset number and the utility calculation, the method may include, at step 192, performing a lookup on a map to determine optimized operational parameters 70. The method may then include, at step 194, determining, based on the lookup, a diagnostic code, a fracturing cost, the utility power request, and the genset power request. At step 196, the method may include ending the electric rig 14 cost optimization.

Figure 8:
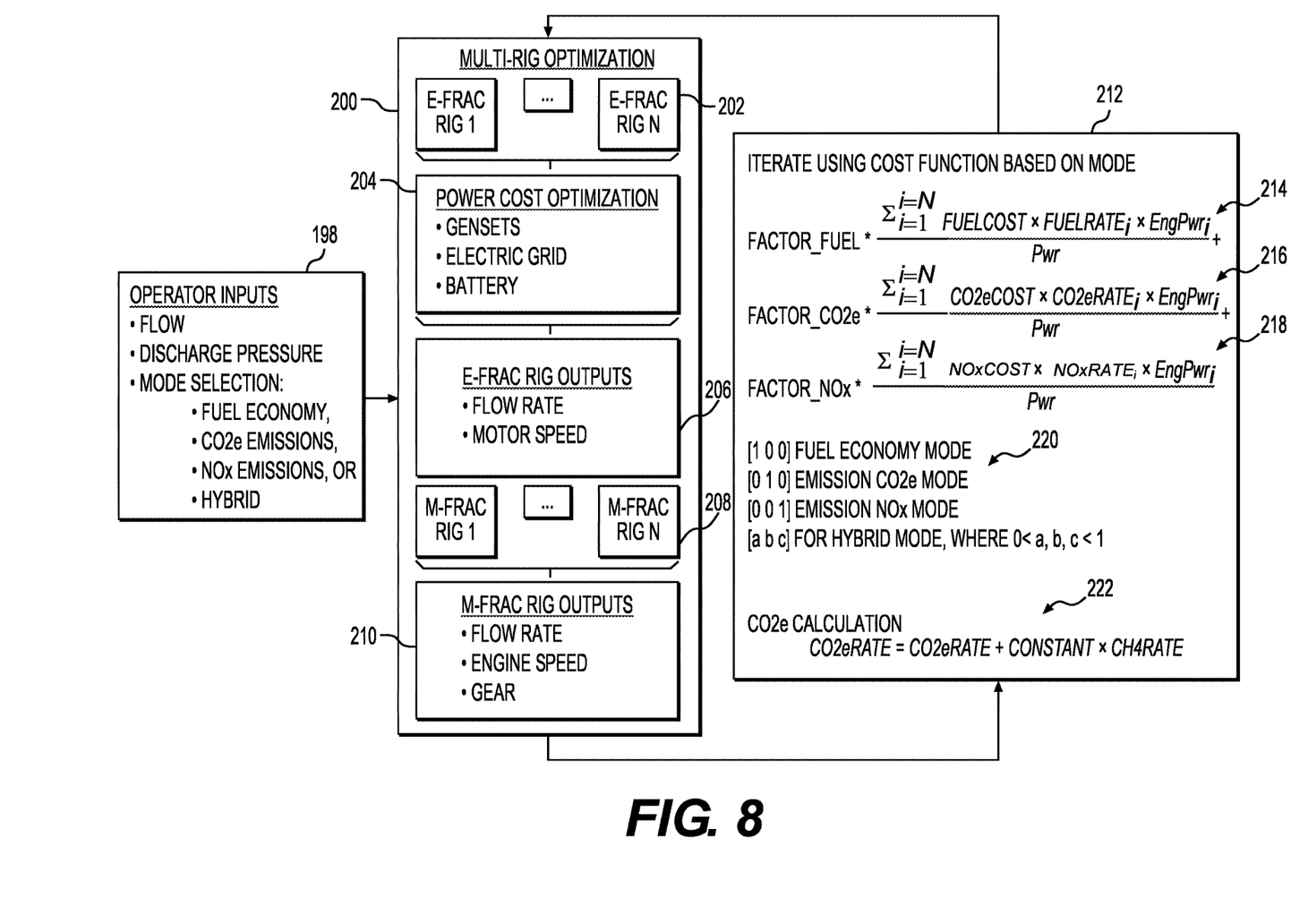
FIG. 8 illustrates a flowchart depicting an exemplary method for optimizing operation of a mixed fleet of hydraulic fracturing rigs, according to aspects of the disclosure.

FIG. 8 illustrates a flowchart depicting an exemplary method for optimizing operation of a mixed fleet of hydraulic fracturing rigs, according to aspects of the disclosure. For example, the method illustrated in FIG. 8 may be performed by the controller 50.

As illustrated at 198, the method may include receiving various operator inputs. For example, the operator inputs may include a flow for hydraulic fracturing operations, a discharge pressure for hydraulic fracturing operations, and a mode selection. The operator inputs may be received via the user device 24, from an operator at the site, from a remote control center, during the hydraulic fracturing operations, before the hydraulic fracturing operations begin, and/or the like.

As illustrated at 200, the method may include performing multi-rig optimization. The multi-rig optimization may include, at 202, receiving information identifying electric hydraulic fracturing rigs 14 for which the optimization is to be performed, a count of the hydraulic fracturing rigs 14, and/or the like. At 204, the multi-rig optimization may include performing a power cost optimization. For example, the power cost optimization may include optimizing the cost of power from available gensets, an available electric grid, an available battery, and/or the like. The power cost optimization may be performed for the total set of electric hydraulic fracturing rigs 14 and/or for each electric hydraulic fracturing rig 14 individually. As illustrated at 206, the multi-rig optimization may include determining outputs (e.g., optimized operational parameters 70) for the electric hydraulic fracturing rigs 14. For example, the outputs may include a flow rate, a motor speed, and/or the like.

The multi-rig optimization may include, at 208, receiving information identifying mechanical hydraulic fracturing rigs 14 for which the optimization is to be performed. As illustrated at 210, the multi-rig optimization may include determining outputs (e.g., optimized operational parameters 70) for the mechanical hydraulic fracturing rigs 14. For example, the outputs may include a flow rate, an engine speed, a gear, and/or the like.

As illustrated at 212, the multi-rig optimization may be iterated through the set of hydraulic fracturing rigs 14 using a cost function 69 that includes sets of terms for the different modes. For example, a fuel mode may be associated with a first set of terms 214 that includes a fuel factor ("FACTOR_FUEL"), a term for fuel cost ("FUELCOST"), a term for a fuel consumption rate ("FUELRATE"), and a term for engine power ("EngPwr$_i$"). As another example, an emission mode for CO2e may be associated with a second set of terms 216 that includes a CO2e factor ("FACTOR_CO2e"), a term for CO2e cost ("CO2eCOST"), a term for CO2e emissions rate ("CO2eRATE$_i$"), and a term for engine power ("EngPwr$_i$"). As another example, an emission mode for NOx may be associated with a third set of terms 218 that includes a NOx factor ("FACTOR_NOx"), a term for NOx emissions cost ("NOxCOST"), a term for NOx emissions rate ("NOxRATE$_i$"), and a term for engine power ("EngPwr$_i$"). For the cost function 69, the first, second, and third sets of terms may be summed for a total score.

As illustrated at 220, in the case of a fuel economy mode the fuel factor may be assigned a value of 1 and the CO2e and NOx factors may be assigned values of 0. Similarly, in the case of an emissions mode for CO2e, the CO2e factor may be assigned a value of 1 and the fuel and NOx factors may be assigned a value of 0. In the case of an emissions mode for NOx, the NOx factor may be assigned a value of 1 and the fuel and CO2e factors may be assigned a value of 0. In the case of a hybrid mode, each of the factors may be assigned a value between 0 and 1 depending on the prioritization of fuel or emissions optimization. As illustrated at 222, the CO2eRATE may be calculated as a CO2e rate plus a constant value ("CONSTANT") multiplied by a methane emissions rate ("CH4RATE").

Figure 9:
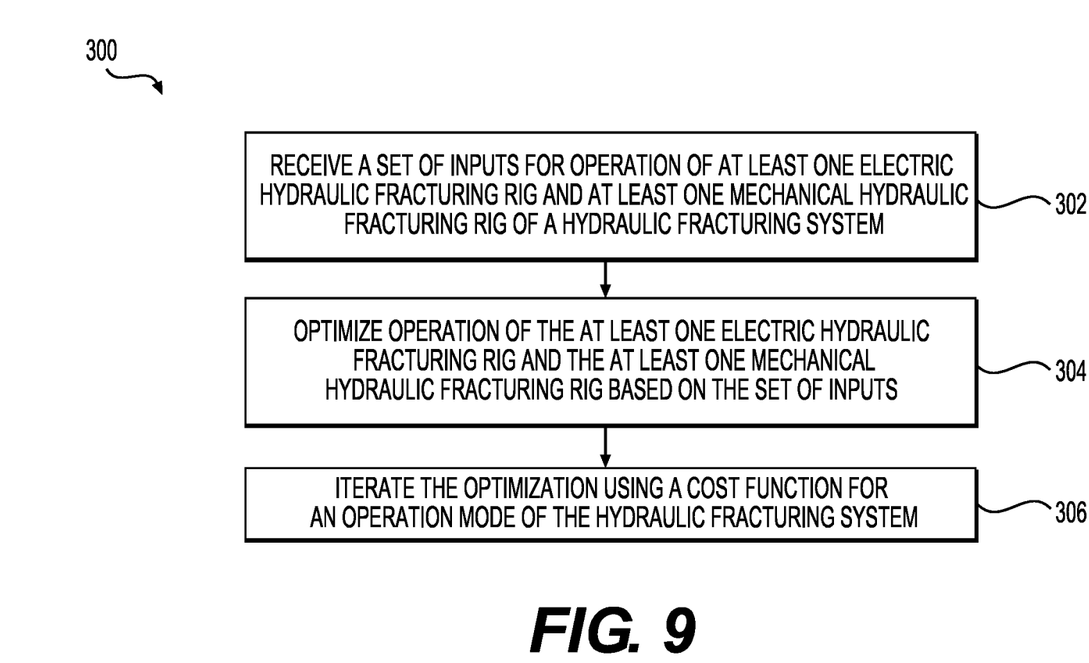
FIG. 9 illustrates a flowchart depicting an exemplary method for optimizing operation of a mixed fleet of hydraulic fracturing rigs, according to aspects of the disclosure.

FIG. 9 illustrates a flowchart depicting an exemplary method 300 for optimizing operation of a mixed fleet of hydraulic fracturing rigs, according to aspects of the disclosure. The method 300 illustrated in FIG. 9 may be implemented by the controller 50. The steps of the method 300 described herein may be embodied as machine readable and executable software instructions, software code, or executable computer programs stored in a memory and executed by a processor of the controller 50. The software instructions may be further embodied in one or more routines, subroutines, or modules and may utilize various auxiliary libraries and input/output functions to communicate with other equipment. The method illustrated in FIG. 9 may also be associated with an operator interface (e.g., a human-machine interface, such as a graphical user interface (GUI)) through which an operator of the hydraulic fracturing rig 14 and/or the hydraulic fracturing system 2 may configure the optimization algorithm 66, may select the input data 56, may set objectives for the optimization algorithm 66, and/or the like. Therefore, the method 300 may be implemented by the controller 50 to provide for optimizing operation of a mixed fleet of a hydraulic fracturing rigs, for example.

At step 302, the method 300 may include receiving a set of inputs for operation of at least one electric hydraulic fracturing rig 14 and at least one mechanical hydraulic fracturing rig 14 of a hydraulic fracturing system 2. For example, the controller 50 may receive the input data 56 from the user device 24 (e.g., as input from a user of the user device 24), from a sensor (e.g., associated with an element of the hydraulic fracturing system 2 and/or a component of an element), from a database (e.g., stored by the data monitoring system 22), from a server device (e.g., in a datacenter that is at a hydraulic fracturing site or remote to the hydraulic fracturing site), and/or the like. The controller 50 may receive the input data 56 prior to hydraulic fracturing operations beginning at a site, during the hydraulic fracturing operations, at scheduled intervals, when certain operating thresholds are exceeded or are not met, and/or the like. In connection with the receiving at step 302, the controller 50 may further receive a cost function to be used by the optimization algorithm 66.

In connection with the receiving at 302, the controller 50 may further receive operating maps for equipment to be controlled. For example, the controller 50 may receive operating maps for one or more hydraulic fracturing rigs 14 from a database. The operating maps may include emissions maps, performance maps, fuel maps, and/or the like associated with the hydraulic fracturing rig 14. A map according to the present disclosure may provide an indication of output parameters of a particular equipment or component thereof as a function of input parameters, such as operating conditions of the hydraulic fracturing rig 14 or a component of the hydraulic fracturing rig 14. For example, an emissions map may indicate an amount of emissions as a function of engine speed and percentage of peak torque or as a function of power output and engine revolution rate. As another example, a performance map may indicate engine efficiency as a function of engine power output and engine age or may indicate parasitic loss of a pump as a function of flow rate and fluid output pressure. As yet another example, a fuel map (e.g., a brake specific fuel consumption (BSFC) map) may indicate a fuel efficiency of an engine based on the rate of fuel consumption and the power produced by the engine.

Additionally, or alternatively, the set of inputs may include a mode selection. For example, the controller 50 may receive input that indicates that the hydraulic fracturing system 2 is to be operated according to a fuel consumption mode, an emissions mode, a hybrid mode, and/or the like. This information may communicate to the controller 50 whether to enable the engine emission control mode and/or the fuel consumption mode. The mode selection information may be input through the user device 24, for example in the data monitoring system 22, by an operator. The mode selection information may be automatically configured based on information relating to the location of the hydraulic fracturing system 2 (e.g., in an area with certain limitations on emissions). Additionally, or alternatively, the mode selection information may include information regarding whether the hydraulic fracturing system 2 is in a condition in which enablement of a mode may not be appropriate or a condition in which the mode may be enabled (e.g., enablement of a fuel consumption mode or an emissions mode may not be appropriate unless hydraulic fracturing rigs 14 with a certain configuration are present at a site).

At step 304, the method 300 may include optimizing operation of the at least one electric hydraulic fracturing rig 14 and the at least one mechanical hydraulic fracturing rig 14 based on the set of inputs. For example, the controller 50 may select values for various operational parameters 70 for a hydraulic fracturing rig 14 and may determine fuel consumption costs and emissions costs of the hydraulic fracturing rig 14 based on those values. In determining the values for the various operational parameters 70, the controller 50, via the optimization algorithm 66, may optimize one or more objectives. For example, the objective may be of any suitable type, such as reducing the cost of the fracking operation, reducing emissions from the fracking operation, reducing idle time during the fracking operation, reducing wear on fracking equipment during the fracking operations, increasing efficiency of the fracking operation, reducing an overall time of the fracking operation, reducing the cost of ownership of the equipment used in the fracking operation, and/or any combinations thereof. As a specific example, the controller 50 may determine optimized operational parameters 70 that minimize fuel costs or emissions costs according to certain maximum limits on such costs. As another specific example, if multiple operating points for the hydraulic fracturing rigs 14 provide lower operating costs, the controller 50, via the optimization algorithm 66, may select one of the points based on an objective, such as selecting the point with the lowest emissions output.

At step 306, the method 300 may include iterating the optimization using a cost function 69 for an operation mode of the hydraulic fracturing system 2. For example, the controller 50 may iterate the optimization using the cost function 69. In some embodiments, the controller 50 may determine optimized operational parameters 70 for a first hydraulic fracturing rig 14 in connection with the step 304 and may then process the optimized operational parameters 70 using the cost function 69. For example, the controller 50 may input the optimized operational parameters 70 to the cost function 69 and may determine whether the score exceeds a threshold. Continuing with the previous example, if the score exceeds the threshold, the controller 50 may re-optimize the operation in connection with the step 304. After processing the optimized operational parameters 70 for the first hydraulic fracturing rig 14, the controller 50 may process the optimized operational parameters 70 for a second hydraulic fracturing rig 14. In some embodiments, the operations at step 306 may include determining a total cost or score for the optimized operational parameters 70 for the entire fleet of hydraulic fracturing rigs 14.

Although the method 300 illustrated in FIG. 9 is described as including steps 302 to 306, the method 300 may not include all of these steps or may include additional or different steps. For example, the method 300 may just include steps 304 and 306.

The controller 50 of the present disclosure can provide real-time (or near real-time) optimization of operation of a mixed fleet of hydraulic fracturing rigs 14. Thus, aspects of the present disclosure may optimize operation for reducing costs or emissions of hydraulic fracturing operations. This may improve operation of a hydraulic fracturing rig 14 without the hydraulic fracturing rig 14 experiencing a significant degradation in performance. In addition, aspects of the present disclosure may optimize the operation by type of hydraulic fracturing rig 14. This may improve operations of the hydraulic fracturing system 2 by reducing emissions, reducing fuel consumption, etc. while satisfying a requested flow rate or other requested operating parameters.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A hydraulic fracturing system, comprising:
   at least one electric hydraulic fracturing rig, wherein the at least one electric hydraulic fracturing rig includes an electric motor, a variable frequency drive, and a pump;
   at least one mechanical hydraulic fracturing rig; and
   a non-transitory computer-readable medium storing instructions that, when executed by a processor of the hydraulic fracturing system, causes the processor to:
      receive a set of inputs for operation of the at least one electric hydraulic fracturing rig and the at least one mechanical hydraulic fracturing rig,
         wherein the set of inputs for operation of the at least one electric hydraulic fracturing rig and the at least one mechanical hydraulic fracturing rig include one or more of: a cost of fuel or power for each of the at least one electric hydraulic fracturing rig and the at least one mechanical hydraulic fracturing rig, a total cost of ownership of each of the at least one electric hydraulic fracturing rig and the at least one mechanical hydraulic fracturing rig, or a cost of emissions for each of the at least one electric hydraulic fracturing rig and the at least one mechanical hydraulic fracturing rig,
      optimize operation of the at least one electric hydraulic fracturing rig and the at least one mechanical hydraulic fracturing rig based on at least the set of inputs;
      iterate the optimization using at least one cost function for at least one operation mode of the hydraulic fracturing system;
      determine one or more outputs for the at least one electric hydraulic fracturing rig and one or more outputs for the at least one mechanical hydraulic fracturing rig, wherein the one or more outputs for the at least one electric hydraulic fracturing rig include one or more outputs for one or more of the electric motor, the variable frequency drive, or the pump; and
      to coordinate operation of the at least one electric hydraulic fracturing rig and the at least one mechanical hydraulic fracturing rig (1) output the one or more outputs for the at least one electric hydraulic fracturing rig to the at least one electric hydraulic fracturing rig, and (2) output the one or more outputs for the at least one mechanical hydraulic fracturing rig to the at least one mechanical hydraulic fracturing rig,
      wherein the one or more outputs for the at least one electric hydraulic fracturing rig include a flow rate or a motor speed for the at least one electric hydraulic fracturing rig, and
      wherein the one or more outputs for the at least one mechanical hydraulic fracturing rig include a flow rate, an engine speed, or a transmission gear for the at least one mechanical hydraulic fracturing rig.

2. The hydraulic fracturing system of claim 1, wherein the optimizing of the operation further comprises:
   optimize the operation for a first electric hydraulic fracturing rig of the at least one electric hydraulic fracturing rig or a first mechanical hydraulic fracturing rig of the at least one mechanical fracturing rig.

3. The hydraulic fracturing system of claim 2, wherein the iterating of the optimization further comprises:
   process optimized operational parameters of the first electric hydraulic fracturing rig or the first mechanical hydraulic fracturing rig based on the cost function; and
   determine whether a score from the cost function exceeds a threshold.

4. The hydraulic fracturing system of claim 3, wherein, for each of the at least one electric hydraulic fracturing rig, the optimized operational parameters comprise at least one of:
   the flow rate, or
   the motor speed.

5. The hydraulic fracturing system of claim 1, wherein the hydraulic fracturing system further comprises at least one power source, and
   wherein the optimizing of the at least one electric hydraulic fracturing rig further comprises:
      optimizing the at least one electric hydraulic fracturing rig based on costs associated with the at least one power source.

6. The hydraulic fracturing system of claim 1, wherein, for each of the at least one mechanical hydraulic fracturing rig, optimized operational parameters comprise at least one of:
   the flow rate,
   the engine speed, or
   the transmission gear.

7. The hydraulic fracturing system of claim 1, wherein the set of inputs comprises at least one of:
   a desired flow rate at a well head,
   a discharge pressure, or
   the at least one operation mode.

8. The hydraulic fracturing system of claim 1, wherein the at least one cost function comprises:
   a fuel cost function,
   a carbon dioxide equivalent (CO2e) cost function, and
   a nitrogen oxide (NOX) cost function.

9. The hydraulic fracturing system of claim 1, wherein the at least one operation mode comprises:
   a fuel conservation mode,
   an emissions reduction mode, or
   a hybrid mode.

10. The hydraulic fracturing system of claim 1, wherein the at least one cost function comprises a nitrogen oxide (NOX) cost function.

11. A method, comprising:
receiving a set of inputs for operation of at least one electric hydraulic fracturing rig and at least one mechanical hydraulic fracturing rig of a hydraulic fracturing system, wherein the at least one electric hydraulic fracturing rig includes an electric motor, a variable frequency drive, and a pump,
wherein the set of inputs for operation of the at least one electric hydraulic fracturing rig and the at least one mechanical hydraulic fracturing rig include one or more of: a cost of fuel or power for each of the at least one electric hydraulic fracturing rig and the at least one mechanical hydraulic fracturing rig, a total cost of ownership of each of the at least one electric hydraulic fracturing rig and the at least one mechanical hydraulic fracturing rig, or a cost of emissions for each of the at least one electric hydraulic fracturing rig and the at least one mechanical hydraulic fracturing rig;
optimizing operation of the at least one electric hydraulic fracturing rig and the at least one mechanical hydraulic fracturing rig based on at least the set of inputs;
iterating the optimization using a cost function for an operation mode of the hydraulic fracturing system, wherein the cost function includes a nitrogen oxide (NOx) cost function; and
operating both the least one hydraulic fracturing rig and the at least one mechanical fracturing rig based at least in part on the optimized operation.

12. The method of claim 11, wherein the optimizing of the operation further comprises:
optimizing the operation for a first electric hydraulic fracturing rig of the at least one electric hydraulic fracturing rig or a first mechanical hydraulic fracturing rig of the at least one mechanical fracturing rig.

13. The method of claim 12, wherein the iterating of the optimization further comprises:
processing optimized operational parameters of the first electric hydraulic fracturing rig or the first mechanical hydraulic fracturing rig based on the cost function; and
determining whether a score from the cost function exceeds a threshold.

14. The method of claim 13, wherein, for each of the at least one electric hydraulic fracturing rig, the optimized operational parameters comprise at least one of:
a flow rate for the pump, or
a motor speed for the electric motor,
wherein, for each of the at least one mechanical hydraulic fracturing rig, the optimized operational parameters include a flow rate, an engine speed, or a transmission gear for the at least one mechanical hydraulic fracturing rig.

15. The method of claim 11, wherein the hydraulic fracturing system further comprises at least one power source, and
wherein the optimizing of the at least one electric hydraulic fracturing rig further comprises:
optimizing the at least one electric hydraulic fracturing rig based on costs associated with the at least one power source.

16. A controller for a hydraulic fracturing system, the controller being configured to:
receive a set of inputs for operation of at least one electric hydraulic fracturing rig and at least one mechanical hydraulic fracturing rig of a hydraulic fracturing system, wherein the at least one electric hydraulic fracturing rig includes an electric motor, a variable frequency drive, and a pump,
wherein the set of inputs for operation of the at least one electric hydraulic fracturing rig and the at least one mechanical hydraulic fracturing rig include one or more of: a cost of fuel or power for each of the at least one electric hydraulic fracturing rig and the at least one mechanical hydraulic fracturing rig, a total cost of ownership of each of the at least one electric hydraulic fracturing rig and the at least one mechanical hydraulic fracturing rig, or a cost of emissions for each of the at least one electric hydraulic fracturing rig and the at least one mechanical hydraulic fracturing rig;
optimize operation of the at least one electric hydraulic fracturing rig and the at least one mechanical hydraulic fracturing rig based on at least the set of inputs;
iterate the optimization using a cost function for an operation mode of the hydraulic fracturing system, wherein the cost function includes a nitrogen oxide (NOx) cost function;
determine outputs for the at least one electric hydraulic fracturing rig and outputs for the at least one mechanical hydraulic fracturing rig;
output the outputs for the at least one electric hydraulic fracturing rig to the at least one electric hydraulic fracturing rig, wherein the outputs for the at least one electric hydraulic fracturing rig include a flow rate for the pump and a motor speed for the electric motor of the at least one electric hydraulic fracturing rig; and
output the outputs for the at least one mechanical hydraulic fracturing rig to the at least one mechanical hydraulic fracturing rig, wherein the outputs for the at least one mechanical hydraulic fracturing rig include each of a flow rate, an engine speed, and a transmission gear for the at least one mechanical hydraulic fracturing rig.

17. The controller of claim 16, wherein the controller is further configured, when optimizing the operation, to:
optimize the operation for a first electric hydraulic fracturing rig of the at least one electric hydraulic fracturing rig or a first mechanical hydraulic fracturing rig of the at least one mechanical fracturing rig.

18. The controller of claim 17, wherein the controller is further configured, when iterating the optimization, to:
process optimized operational parameters of the first electric hydraulic fracturing rig or the first mechanical hydraulic fracturing rig based on the cost function; and
determine whether a score from the cost function exceeds a threshold.

19. The controller of claim 16, wherein the set of inputs further comprises each of:
a desired flow rate at a well head,
a discharge pressure, and
the at least one operation mode.

20. The controller of claim 16, wherein the optimization includes optimizing a cost of power from:
available gensets,
an available electrical grid, and
an available battery.

* * * * *